United States Patent

Kanemaki et al.

[11] Patent Number: 6,081,845
[45] Date of Patent: Jun. 27, 2000

[54] ARP SERVER

[75] Inventors: Hideyasu Kanemaki; Takeshi Okamoto; Satoshi Fudatate; Eitarou Hiraga; Toshikatsu Atarashi; Minoru Yamaguchi, all of Kawasaki, Japan

[73] Assignee: Fujitsu Limited, Kanagawa, Japan

[21] Appl. No.: 08/929,559

[22] Filed: Sep. 15, 1997

[30] Foreign Application Priority Data

Mar. 18, 1997 [JP] Japan ................................... 9-065030

[51] Int. Cl.[7] ............................ G06F 13/38; G06F 15/17
[52] U.S. Cl. ........................ 709/238; 709/203; 709/228; 709/226; 709/242; 709/214; 709/236
[58] Field of Search .................................. 709/238, 203, 709/228, 236, 242, 226, 214, 239

[56] References Cited

U.S. PATENT DOCUMENTS

| | | | |
|---|---|---|---|
| 5,315,586 | 5/1994 | Charvillat | 709/226 |
| 5,440,547 | 8/1995 | Easki et al. | 709/238 |
| 5,473,362 | 12/1995 | Fitzgerald et al. | 709/242 |
| 5,581,552 | 12/1996 | Civanlar et al. | 709/203 |
| 5,600,644 | 2/1997 | Chang et al. | 709/238 |
| 5,617,540 | 4/1997 | Civanlar et al. | 709/203 |
| 5,646,984 | 7/1997 | Oda | 709/214 |
| 5,764,645 | 6/1998 | Bernet | 709/238 |
| 5,790,806 | 8/1998 | Koperda | 709/238 |
| 5,809,233 | 9/1998 | Shur | 709/238 |
| 5,818,842 | 10/1998 | Burwell et al. | 709/238 |
| 5,828,844 | 10/1998 | Civanlar et al. | 709/238 |
| 5,878,212 | 3/1999 | Civanlar et al. | 709/228 |
| 5,909,238 | 6/1999 | Nagashima et al. | 709/236 |

FOREIGN PATENT DOCUMENTS

| | | |
|---|---|---|
| 5-344161 | 12/1993 | Japan . |
| 06197131 | 7/1994 | Japan . |
| 06205050 | 7/1994 | Japan . |

*Primary Examiner*—Frank J. Asta
*Assistant Examiner*—Farzaneh Farahi
*Attorney, Agent, or Firm*—Helfgott & Karas, P.C.

[57] ABSTRACT

An ARP server which can inform a calling terminal of an address suitable for an intended communication with a receiving terminal among a plurality of addresses usable for that purpose. The ARP server is equipped with an ATMARP table consisting of a plurality of unit tables each of which correlates an IP address and a plurality of ATM addresses. When receiving an inquiry about an ATM address corresponding to a certain IP address, the ARP server checks free bandwidths of circuits relating to respective ATM addresses in a unit table that corresponds to the IP address of interest, and informs the terminal that issued the inquiry of an ATM address with the largest free bandwidth.

17 Claims, 20 Drawing Sheets

FIG. 3

| IP ADDRESS | ATM ADDRESS |
|---|---|
| B. b | 700-1111 |
|  | 800-1112 |

FIG. 4

|  | 600 | 700 | 800 |
|---|---|---|---|
| 600 |  | 30 | 150 |
| 700 | 30 |  | 50 |
| 800 | 150 | 50 |  |

FIG. 9A

| IP ADDRESS | ATM ADDRESS | MAXIMUM USE BANDWIDTH | BANDWIDTH IN USE | FREE BANDWIDTH |
|---|---|---|---|---|
| B.b | 700-1111 | | | |
| | 800-1112 | | | |

FIG. 9B

| IP ADDRESS | ATM ADDRESS | MAXIMUM USE BANDWIDTH | BANDWIDTH IN USE | FREE BANDWIDTH |
|---|---|---|---|---|
| B.b | 700-1111 | 150 Mbps | 10 Mbps | 140 Mbps |
| | 800-1112 | | | |

FIG. 9C

| IP ADDRESS | ATM ADDRESS | MAXIMUM USE BANDWIDTH | BANDWIDTH IN USE | FREE BANDWIDTH |
|---|---|---|---|---|
| B.b | 700-1111 | 150 Mbps | 10 Mbps | 140 Mbps |
| | 800-1112 | 150 Mbps | 150 Mbps | 0 Mbps |

FIG. 12A

| CALLING STATION | IP ADDRESS | ATM ADDRESS | RECEIVING STATION | CONNECTION CHARGE |
|---|---|---|---|---|
| 600 | B.b | 700-1111 | | |
| | | 800-1112 | | |

FIG. 12B

| CALLING STATION | IP ADDRESS | ATM ADDRESS | RECEIVING STATION | CONNECTION CHARGE |
|---|---|---|---|---|
| 600 | B.b | 700-1111 | 700 | 30 |
| | | 800-1112 | | |

FIG. 12C

| CALLING STATION | IP ADDRESS | ATM ADDRESS | RECEIVING STATION | CONNECTION CHARGE |
|---|---|---|---|---|
| 600 | B.b | 700-1111 | 700 | 30 |
| | | 800-1112 | 800 | 150 |

FIG. 16A

| IP ADDRESS | APPLICATION VALUE | ATM ADDRESS | MAXIMUM BANDWIDTH | BANDWIDTH IN USE | FREE BANDWIDTH |
|---|---|---|---|---|---|
| B . b | 100 Mbps | 700-1111 | | | |
| | | 800-1112 | | | |

FIG. 16B

| IP ADDRESS | APPLICATION VALUE | ATM ADDRESS | MAXIMUM BANDWIDTH | BANDWIDTH IN USE | FREE BANDWIDTH |
|---|---|---|---|---|---|
| B . b | 100 Mbps | 700-1111 | 150 Mbps | 100 Mbps | 50 Mbps |
| | | 800-1112 | | | |

FIG. 16C

| IP ADDRESS | APPLICATION VALUE | ATM ADDRESS | MAXIMUM BANDWIDTH | BANDWIDTH IN USE | FREE BANDWIDTH |
|---|---|---|---|---|---|
| B . b | 100 Mbps | 700-1111 | 150 Mbps | 100 Mbps | 50 Mbps |
| | | 800-1112 | 150 Mbps | 10 Mbps | 140 Mbps |

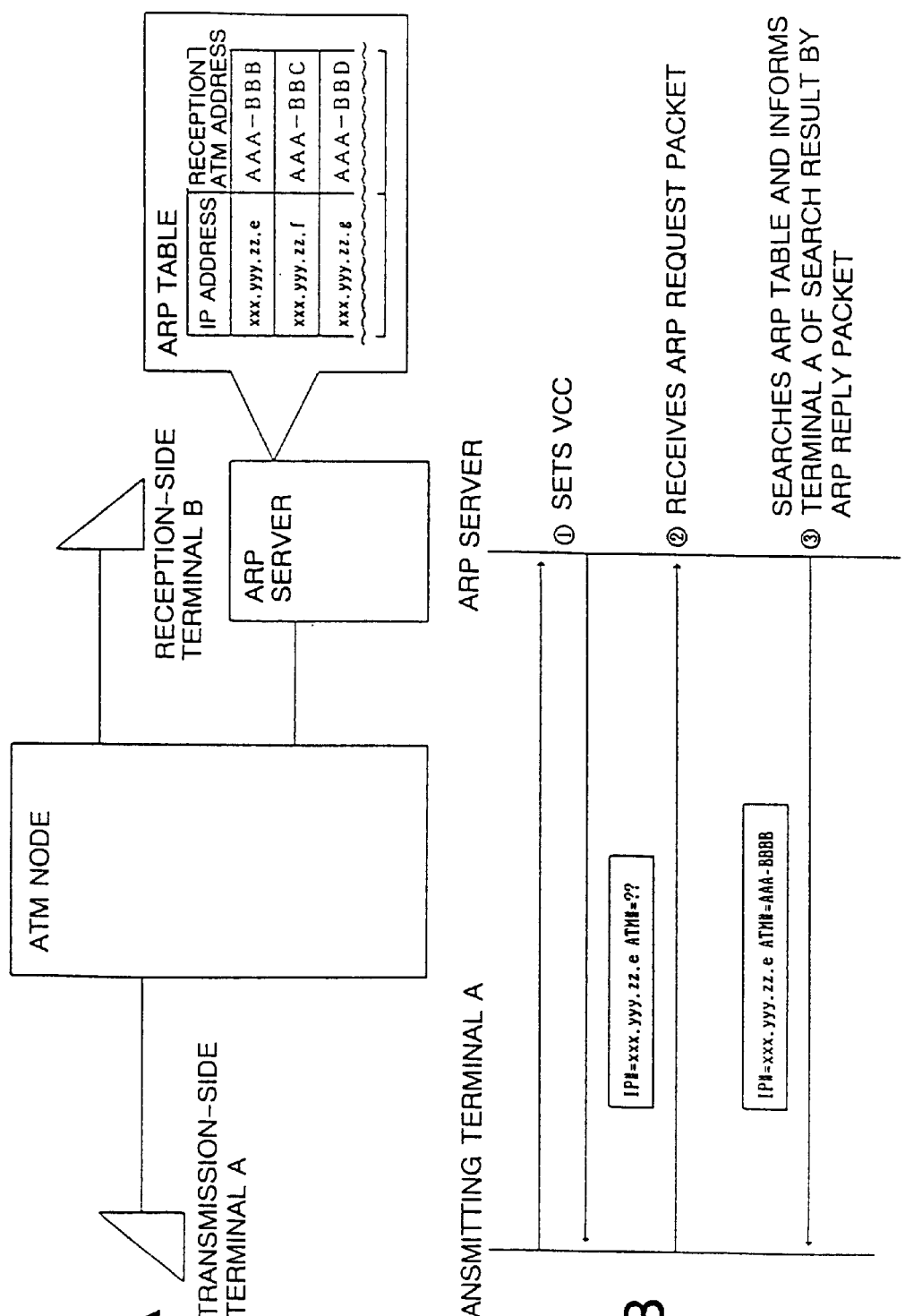

ARP SERVER

BACKGROUND OF THE INVENTION

1. Field of the Invention

The present invention relates to an ARP server that is used in realizing a communication according to IP over ATM or the like.

2. Description of the Related Art

The Internet employs TCP/IP (transmission control protocol/Internet protocol) as its standard protocol. On the other hand, efforts are now being made to introduce the ATM (asynchronous transfer mode) technology into networks. To this end, the IETF (Internet Engineering Task Force) is now studying the protocol called "IP over ATM" to enable communications according to TCP/IP on ATM networks.

In the Internet, if the IP address of a terminal as a party to communicate with is known, one can communicate with that party according to TCP/IP. In an ATM network, however, even if the IP address of a party to communicate with is known, a communication cannot be made unless the ATM address of that terminal is known. In view of this, to allow a host application to perform a communication without being aware of the use of an ATM network, IP and ATM prescribes an address resolution technique for correlating an IP address with an ATM address and a procedure for setting an ATM connection.

IP over ATM will be outlined below with reference to FIGS. 21A and 21B. As shown in FIG. 21A, an ATM network where communications are performed according to IP over ATM is provided with a ATMARP (ATM address resolution protocol) having an ATMARP table which is a correlation table between IP addresses and ATM addresses for all terminals that are to perform communications.

For example, when terminal A starts an IP communication with terminal B, first of all terminal A sends a setup message to an ARP server as shown in FIG. 21A. Upon reception of the setup message from terminal A, the ARP server sets an ATM connection (VCC: virtual channel connection) and sends a call reception message to terminal A.

Upon reception of the call reception message, terminal A sends an ARP request packet including the IP address of terminal B by using the ATM connection thus set. Upon reception of the ARP request packet, the ARP server finds the address corresponding to the IP address included in the packet, i.e., the ATM address of terminal B by searching the ATMARP table. The ARP server transmits, to terminal A, an ARP relay packet in which the thus-found ATM address is set.

After acquiring the ATM address of the terminal of the party to communicate with by the above procedure (after address resolution), terminal A transmits a setup message to terminal B by using the ATM address thus acquired and starts to transmit IP packets when receiving a call reception message from terminal B.

As described above, Ip over ATM is constructed based on the existence of the ATMARP server which returns one ATM address for one IP address. Therefore, even where a plurality of circuits are set a receiving terminal and an ATM network, a calling terminal can acquire the ATM address of only one of those circuits from the ATMARP server. If that circuit is busy, a call cannot be established even if the other circuits are available.

Similarly, where a receiving terminal is a terminal on a wide area LAN network that is connected to a certain ATM network at plural locations, there may occur an even that a call cannot be established because the ATM addresses of the other connection points are unknown. In this case, there is even a possibility that a call is established with a route of a high connection charge in spite of the existence of a less expensive communication route.

The above problems is not limited to IP over ATM, and similar problems occur in LAN emulation for allowing an exchange, via an ATM network, of data that is transferred on a LAN such as an Ethernet or a token-ring network, and LE ARP (LAN emulation ARP) for converting a MAC (media access control) address into an ATM address.

Further, in the DNS (domain name service) of the current Internet using TCP/IP, an IP address is acquired from a domain name as an address of a terminal to communicate with. A current DNS server cannot accommodate a request that one IP address should be accessed in the daytime and the other in the night-time.

SUMMARY OF THE INVENTION

An object of the present invention is therefore to provide an ARP server which can inform a calling terminal of an address suitable for an intended communication from among a plurality of addresses that can be used to communicate with a receiving terminal.

To attain the above object, the invention provides an ARP server to be used in a network in which a communication is performed according to a first protocol, comprising (a) a storing section for storing, for each of a plurality of terminals that perform a communication by using the network, a second address that is used in performing a communication according to a second protocol and at least one first address that can be used in performing a communication according to the first protocol; (b) a recognizing section for recognizing, based on received information, a second address for which a first address is to be selected and a terminal to be informed of the selected first address; (c) a readout section for reading out all of first addresses corresponding to the recognized second address from the storing section; (d) a selecting section for selecting one first address from among the read-out first addresses according to a predetermined condition; and (e) a transmitting section for transmitting the selected first address to the terminal recognized by the recognizing section.

In a communication network using the above-configured ARP server, when there are a plurality of communication routes (first addresses) to a receiving terminal, a calling terminal that intends to perform a communication with the receiving terminal can be informed of one of the plurality of first addresses that is suitable for the intended communication for a certain reason.

In implementing the ARP server according to the invention, the selecting section may be a section that selects one first address by using a condition that relates to a date and time.

There may further be provided a condition changing section for changing the condition used in the selecting section based on received information. The condition changing section may be a section that changes the condition used in the selecting section based on a first address included in information that is first received by the recognizing section.

Where the network is one capable of managing a free bandwidth, it is desirable that the ARP server be further provided with an acquiring section for acquiring a free bandwidth of a circuit relating to each of the read-out first addresses, and that the selecting section selects a first address with a largest free bandwidth from among the read-out first addresses.

The ARP server may further be provided with a charge information storing section for storing charge information to be used for calculation of a charge of a communication that uses a first address; and a charge calculating section for calculating a charge of a communication between the recognized terminal and each of the read-out first addresses, and the selecting section may be a section that selects a first address with a lowest charge from among the read-out first addresses.

Further, the ARP server may further be provided with a bandwidth application value recognizing section for recognizing a bandwidth application value based on received information; and an acquiring section for sequentially acquiring free bandwidths of circuits relating to the respective read-out first addresses, and the selecting may be a section that selects, if the acquiring section has acquired a free bandwidth greater than or equal to the recognized bandwidth application value, a first address that was used in acquiring it. In this case, the selecting section may be a section that selects a first address with a largest free bandwidth if the bandwidth application value recognizing section has not recognized any bandwidth application value, or a section that selects a first address that was first read out by the readout section if the bandwidth application value recognizing section has not recognized any bandwidth application value.

The ARP server may further be provided with a second transmitting section for transmitting, if an operation of the acquiring section has completed without acquiring a free bandwidth greater than or equal to the recognized bandwidth application value, information to that effect to the recognized terminal.

The selecting section may be a section that selects a first address with a largest free bandwidth if an operation of the acquiring section has completed without acquiring a free bandwidth greater than or equal to the recognized bandwidth application value, or a section that selects a first address that was first read out by the readout section if an operation of the acquiring section has completed without acquiring a free bandwidth greater than or equal to the recognized bandwidth application value.

Where the bandwidth application value recognizing section is employed, it is desirable to use, as the transmitting section, a section for transmitting, to the recognized terminal, the selected first address and a free bandwidth acquired by the acquiring section for the selected first address.

The ARP server may further be provided with an updating section for updating contents of the storing section based on received information.

BRIEF DESCRIPTION OF THE DRAWINGS

FIG. 3 shows a unit table that constitutes an ATMARP table possessed by the ATMARP server of the embodiment;

FIG. 4 shows a connection charge table possessed by the ATMARP server of the embodiment;

FIGS. 9A–9C show how a work area of the ATMARP server is used in the first response process;

FIGS. 12A–12C show how the work area of the ATMARP server is used in the second response process;

FIGS. 16A–16C show how the work area of the ATMARP server is used in the third response process;

FIGS. 21A and 21B illustrate a conventional IP over ATM scheme.

DETAILED DESCRIPTION OF THE PREFERRED EMBODIMENT

An embodiment of the present invention will be hereinafter described in detail with reference to the accompanying drawings.

Figure 1:
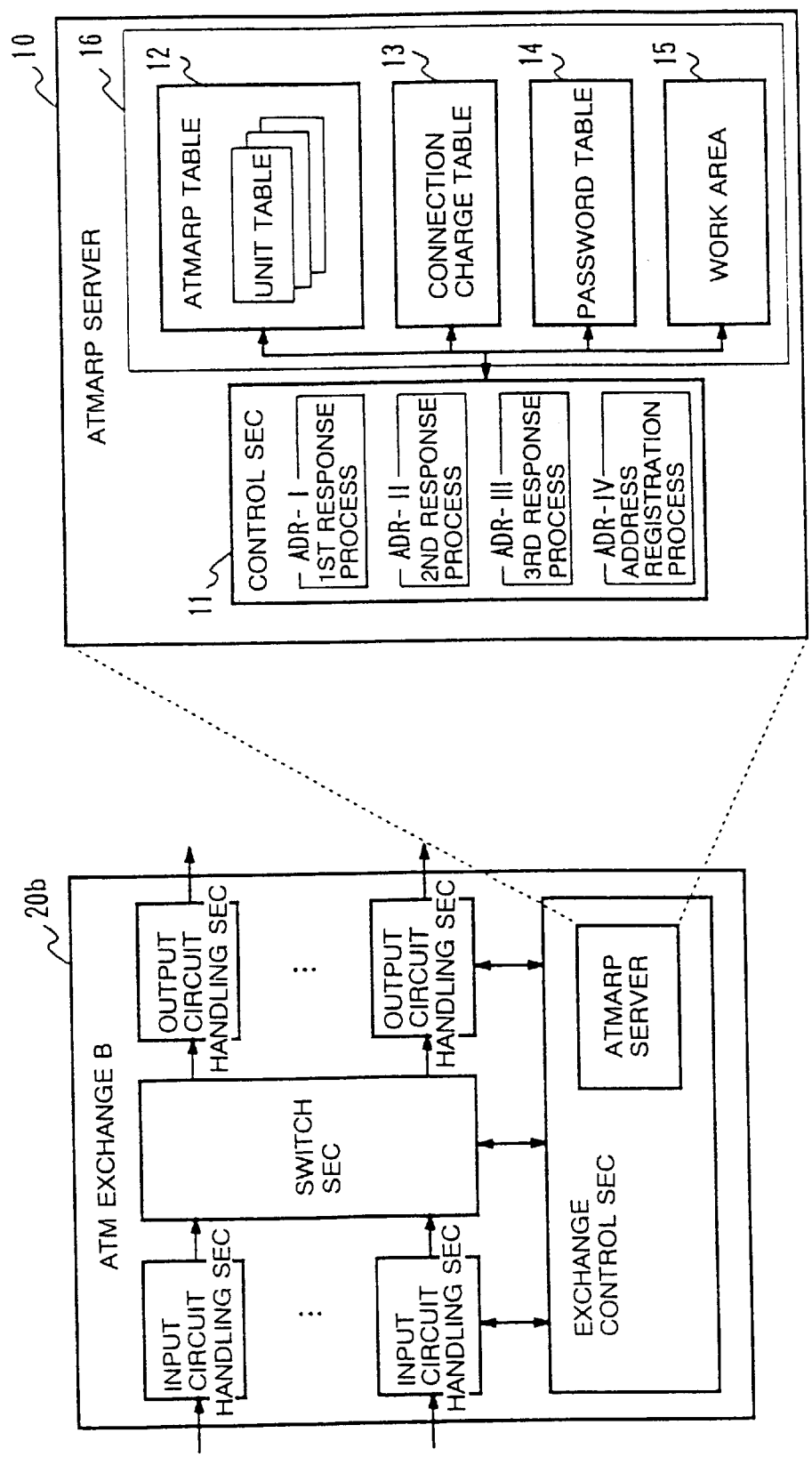
FIG. 1 shows a general configuration of an ATMARP server according to an embodiment of the present invention.
Figure 2:
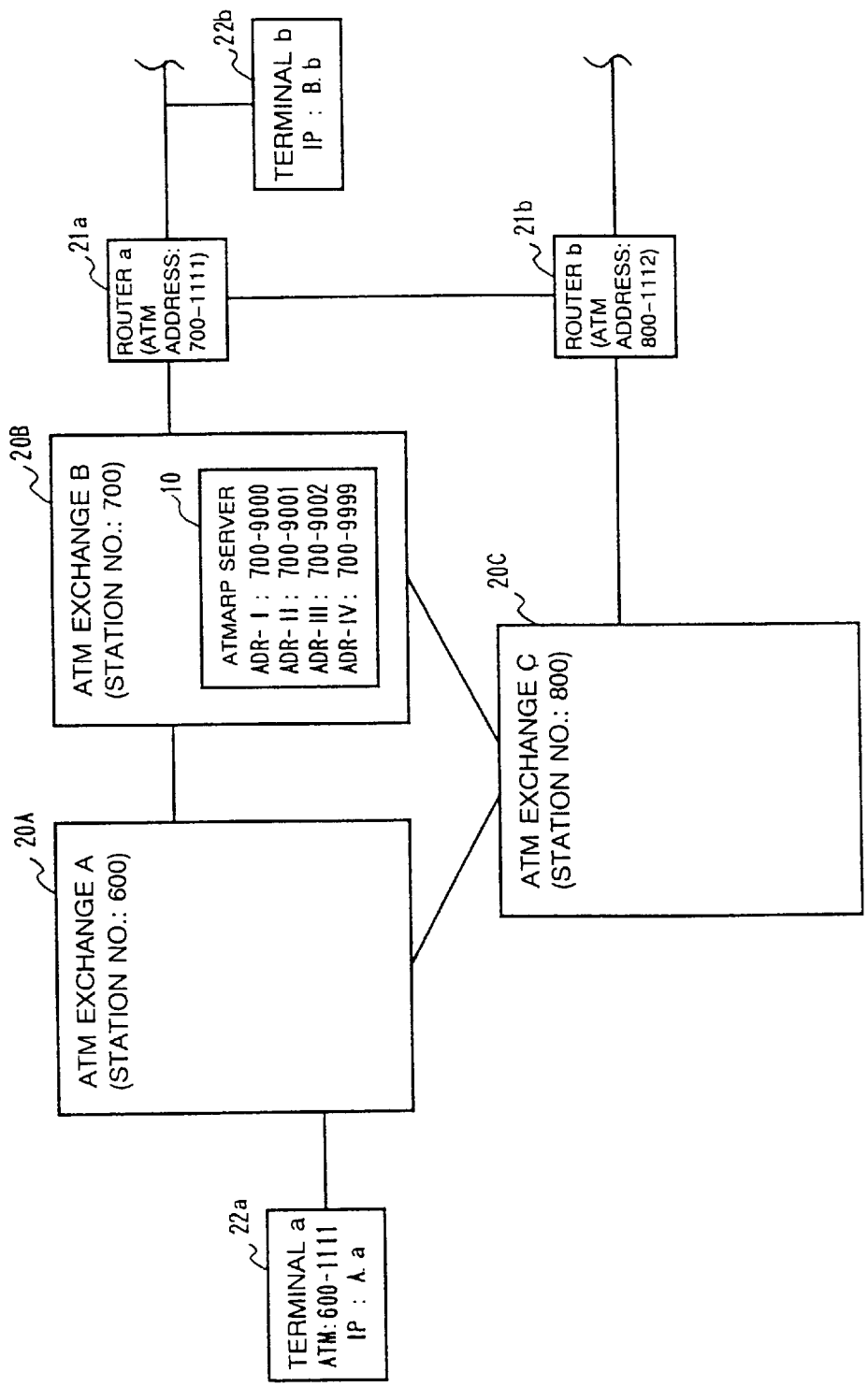
FIG. 2 shows a general configuration of a communication network according to the invention.

First, with reference to FIGS. 1 and 2, the configuration and the operation of a communication network according to an embodiment of the invention will be outlined. FIG. 2 shows a general configuration of a communication network according to the embodiment, and FIG. 1 shows a general configuration of an ATMARP server according to the embodiment provided in the communication network of FIG. 2.

Referring to FIG. 2, the communication network of the embodiment, which is according to the IP over ATM scheme, is constituted of an ATMARP server 10 (hereinafter also referred to as "ARP server 10"), a plurality of (three in FIG. 2) ATM exchanges 20, one or more (two in FIG. 2) routers 21, and a plurality of terminals 22 that communicate with each other via the ATM exchanges 20 and the routers 21 according to the IP over ATM scheme. As shown in FIG. 2, the ARP server 10 of the embodiment is provided in an ATM exchange 20B and has four ATM addresses ADR-I to ADR-IV.

More specifically, as shown in FIG. 1, the ARP server 10 of the embodiment is provided in an exchange control section of the ATM exchange 20B which consists of a plurality of input circuit handling sections, a plurality of output circuit handling sections, and the above-mentioned exchange control section. The ARP server 10 is equipped with a control section 11 that is an electronic circuit having a CPU as the main element and a memory section 16 that serves as an ATMARP table 12, a connection charge table 13, a work area 15, and a password table 14.

The control section 11 has a function of exchanging information with the respective apparatuses in the communication network via the ATM exchange 20B. When receiving a call request message (setup message) to the addresses ADR-I to ADR-IV, the control section 11 executes processes named first to third processes response processes and an address registration process, respectively. The control section 11 is also connected to a maintenance terminal (not shown) of the ATM exchange 20B, and executes a process corresponding to the content of a manipulation on the maintenance terminal.

The details of the respective processes will be described later. The first to third response processes are processes for responding to an inquiry about an ATM address from each terminal 22 that constitutes the communication network.

The ATMARP table 12 (hereinafter also referred to as "ARP table 12") is a table (a data group stored in a given memory area of the memory section 16) whose content is referred to in each response processing. The ATMARP table 12 stores a correlation between ATM addresses and IP addresses like the ATMARP table of the conventional ATMARP server. However, as shown in FIGS. 1 and 3, the ATMARP table 12 of the ARP server 10 is constituted of a plurality of unit tables each of which stores a plurality of ATM addresses for one IP address. That is, in contrast to the conventional ATMARP table, the ATMARP table 12 can store a plurality of ATM addresses such that they are correlated with one IP address.

In the address registration process, a new (or content-updated) unit table is registered in the ATMARP table 12 based on information provided from a terminal; that is, a data set consisting of an IP address and several ATM addresses is written to a given memory area of the memory section 16. The password table 14 is a table that stores a correlation between IP addresses and passwords given to the owners of the IP addresses. In executing the address registration process, the control section 11 confirms legitimacy of a person who request registration of a unit table by referring to the password table 14. The password table 14 is generated or updated by the control section 11 that is given a password generation/updating instruction from the maintenance terminal.

The connection charge table 13, which is referred to in executing the second response process, stores information which allows a calculation unit ("30," "50," or the like) of a connection charge from a combination of station numbers ("600," "700," or the like) of calling and receiving ATM exchanges, as schematically shown in FIG. 4. The connection charge table 13 is also generated or updated by the control section 11 that is given a connection charge generation/updating instruction from the maintenance terminal.

The operations of the respective apparatuses of the communication network concerned will be described below in detail. First, a description will be made of how the respective apparatuses operate when the first response process is executed, with an assumption that units tables have already been registered in the ATMARP table 12.

Figure 5:
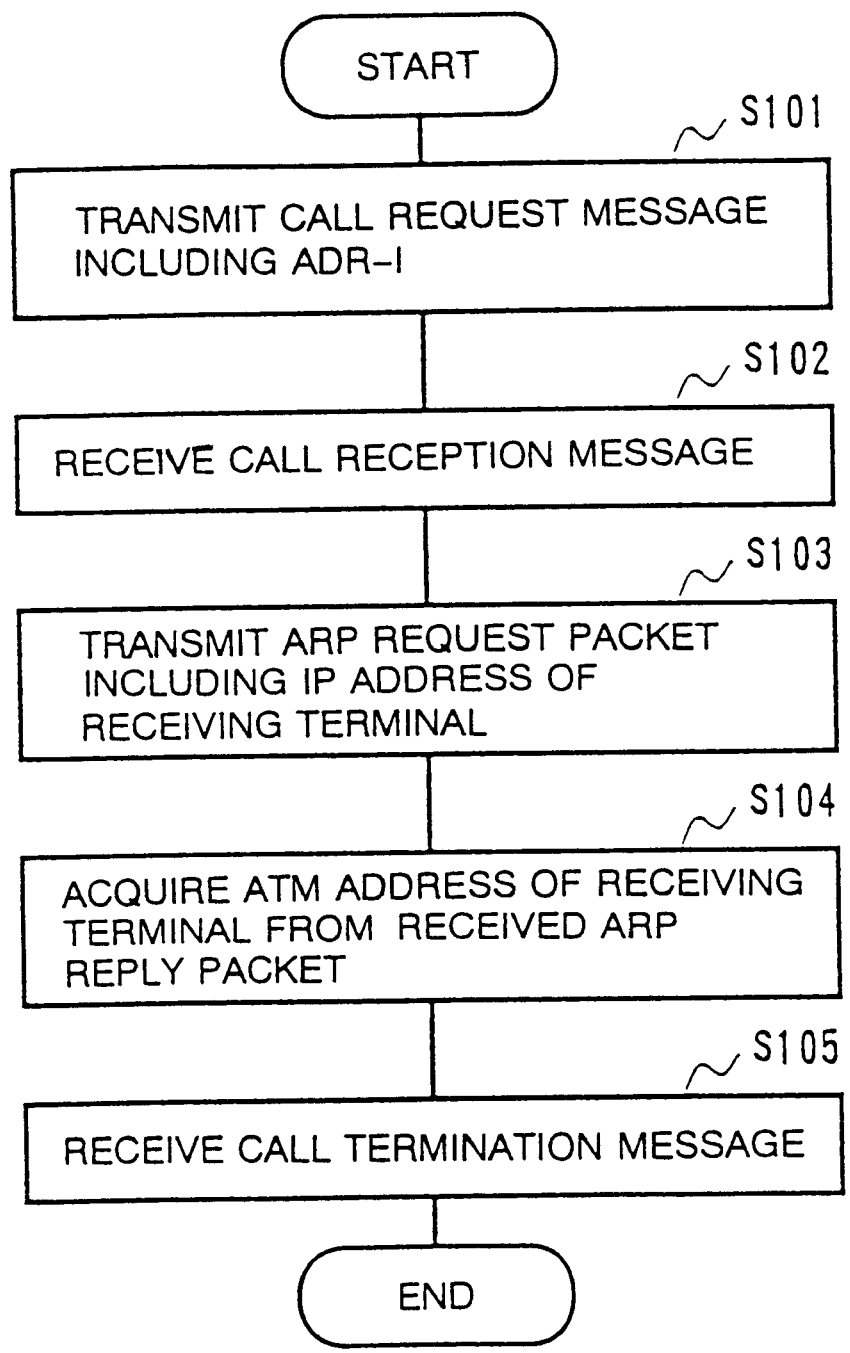
FIG. 5 is a flowchart showing an operation procedure of a calling terminal until it acquires an ATM address by using a first response process.

As described above, the first response process, which is executed by the ARP server 10 (control section 11) to respond to an inquiry about an ATM address, is started by the controller 11 when it receives a call request message including ADR-I. In this case, as shown in FIG. 5, a terminal (calling terminal) that inquires of the ARP server 10 about an ATM address operates according to entirely the same procedure as a terminal in a communication network of the ordinary IP over ATM scheme does.

Specifically, at step S101, the calling terminal sends a call request message including the ATM address ADR-I of the ARP server 10. At step S102, the calling terminal receives, from the ARP server 10, a call reception message that is a response to the call request message. At step S103, the calling terminal sends, to the ARP server 10, an ARP request packet in which the IP address of a terminal (receiving terminal) that needs an ATM address by using the ATM connection that has been established with the ARP server 10. Then, at step S104, the calling terminal receives an ARP reply packet that is transmitted from the ARP server 10 which has received the ARP request packet, and acquires, as an ATM address of the receiving terminal, an ATM address that is included in the received ARP reply packet.

At step S105, the calling terminal receives a call termination request from the ARP server 10, as a result of which the process that started with the transmission of the call request message is completed, that is, the ATM connection with the ARP server 10 is freed.

On the other hand, the ARP server 10 operates according to a different procedure than an ARP server in a communication network of the ordinary IP over ATM scheme.

Figure 6:
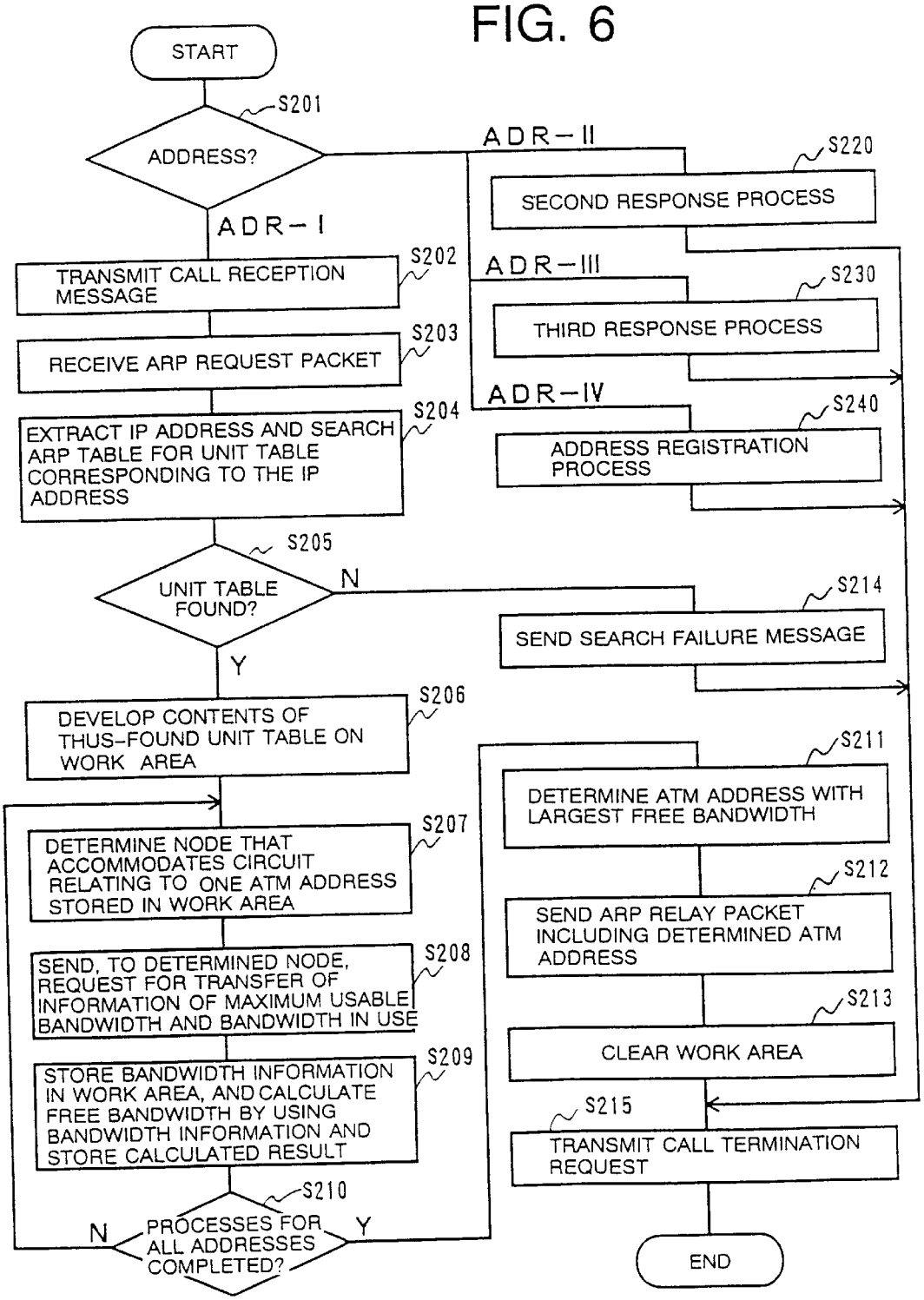
FIG. 6 is a flowchart showing the entire operation procedure of the ATMARP server of the embodiment.

With reference to FIG. 6, the operation of the ARP server 10 corresponding to the above-described operation of the calling terminal will be described below. FIG. 6 is a flowchart also including operation procedures of the ARP server 10 (control section 11) that are to be executed when call request messages directed to the addresses other than ADR-I are received. The control section 11 starts to execute the process of this flowchart when receiving a call request message including one of ADR-I to ADR-IV.

As shown in FIG. 6, at step S201, when receiving a call request message, the ARP server 10 judges whether the address included in the call request message is one of ADR-I to ADR-IV. If the address is ADR-II (step S201: ADR-II), the ARP server 10 executes the second response process at step S220. If the address is ADR-III (step S201: ADR-III), the ARP server 10 executes the third response process at step S230. If the address is ADR-IV (step S201: ADR-IV), the ARP server 10 executes the address registration process at step S240. The details of these processes will be described later.

If the address included in the received call request message is ADR-I (step S201: ADR-I), the control section 11 starts the first response process (steps S202–S214). First, at step S202, the control section 11 transmits a call reception message to the calling terminal.

At step S203, the control section 11 receives an ARP request packet including an IP address from the calling terminal that received the call reception message. When receiving the ARP request packet, at step S204 the control section 11 extracts the IP address from the packet and searches the ARP table 12 for a unit table relating to that IP address.

If a unit table relating to the extracted IP address was found (step S205: Y), at step S206 the control section 11 develops the contents of the unit table (see FIG. 3) on the work area 15. In this case, the control section 11 develops the contents of the unit table such that various kinds of information (maximum usable bandwidth, bandwidth in use, and free bandwidth) that will be acquired or calculated later can be stored so as to be correlated with each of a plurality of ATM addresses included in the unit table.

At step S207, the ARP server 10 selects one ATM address stored in the work area 15 and determines a node (ATM exchange) that accommodates a terminal (or a router) that is identified by that ATM address. At this step, the node determination is performed according to the same procedure as a procedure for determining a node that accommodates a target terminal in an ATM exchange in the case of an ordinary call.

Figure 7:
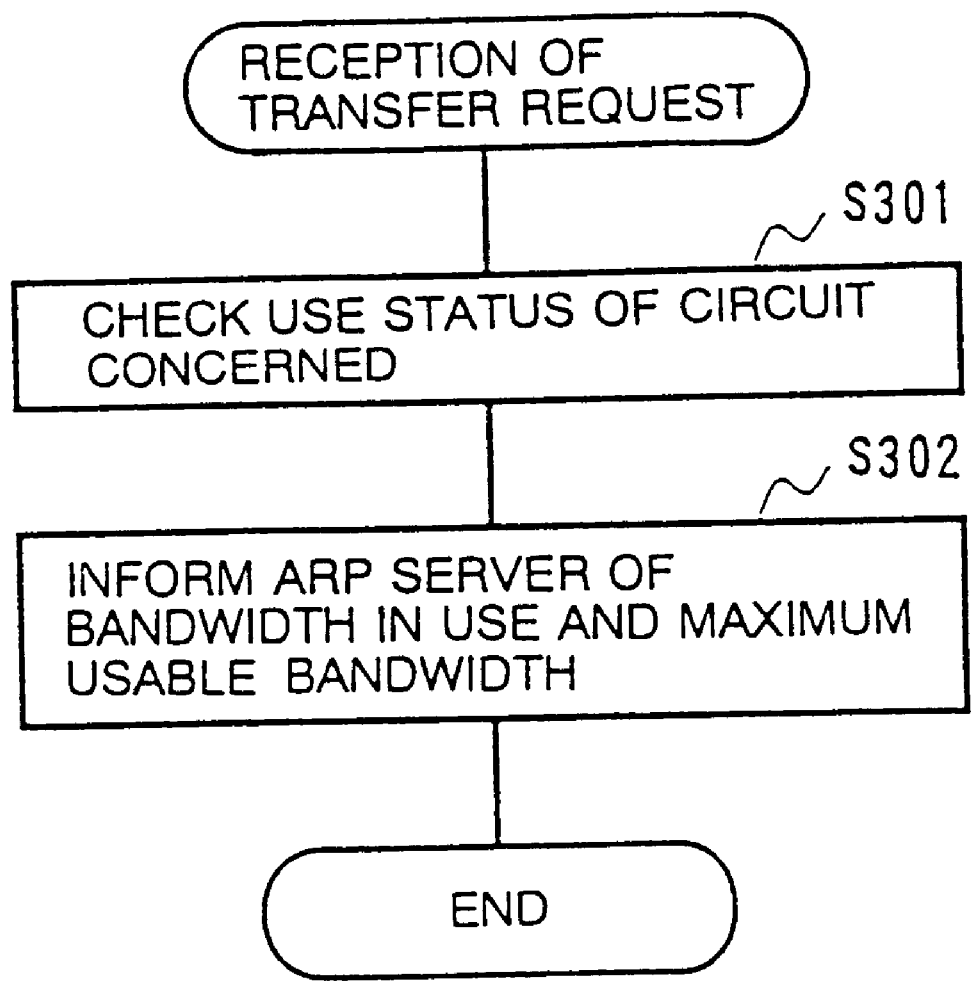
FIG. 7 is a flowchart showing an operation procedure of an ATM exchange that has received a request for transfer of a circuit status.

After the node determination, at step S208, the control section 11 sends, to the node, a request for transfer of a circuit status (maximum usable bandwidth and bandwidth in use). As shown in FIG. 7, the node (ATM exchange) that has received the request for transfer of a circuit status checks the status (bandwidth in use) of a circuit concerned (step S301) and transmits, to the ARP server 10, a circuit status message including information of the bandwidth in use and the maximum usable bandwidth (step S302).

Upon reception of the circuit status message from the node to which the control section 11 has sent the transfer request, at step S209 the control section 11 stores, in the work area 15, the information of the maximum usable bandwidth and the bandwidth in use that is included in the message. Further, the control section 11 calculates a free bandwidth (=(maximum usable bandwidth)−(bandwidth in use)) by using the above bandwidth information and stores the information of the calculated free bandwidth in the work area 15.

Then, the control section 11 judges whether the processes for all the ATM addresses have been completed. If they have not been completed (step S210: N), the control section 11 again executes steps S207–S209 to acquire information of the use status of a circuit relating to the next ATM address. When the processes for all the ATM addresses have been completed (step S210: Y), the control section 11 goes out of the loop of steps S207–S210 and proceeds to step S211.

At step S211, the control section 11 determines an ATM address that is correlated with the largest free bandwidth among the ATM addresses stored in the work area 15. If there are a plurality of ATM addresses that are correlated with the largest free bandwidth, the control section 11 selects one of those ATM addresses that is closest to the head of the unit table. Then, the control section 11 sends an ARP reply packet including the determined ATM address at step S212 and clears the work area 15 at step S213.

Thereafter, the control section 11 sends a call termination request message at step S215, and completes the series of processes. Incidentally, the control section 11 also executes step S215 after execution of the second or third response process (step S220 or S230). If a unit table corresponding to the extracted IP address is not found by the search of step S204 (step S205: N), the control section 11 sends a search failure message at step S214, then executes step S215, and completes the series of processes.

Although not shown in FIG. 6, if it is found at step S206 that only one ATM address is included in the unit table, the control section 11 proceeds, without executing steps S207–S211, to step S212, where it sends an ARP relay packet including the above ATM address.

The ope ations of the calling terminal and the ARP server 10 will be described below in more detail with reference to FIGS. 8 and 9A–9C by using an example in which the calling terminal is the terminal 22a (see FIG. 2) and the calling terminal needs an ATM address of the terminal 22b that is set in the unit table shown in FIG. 3.

Figure 8:
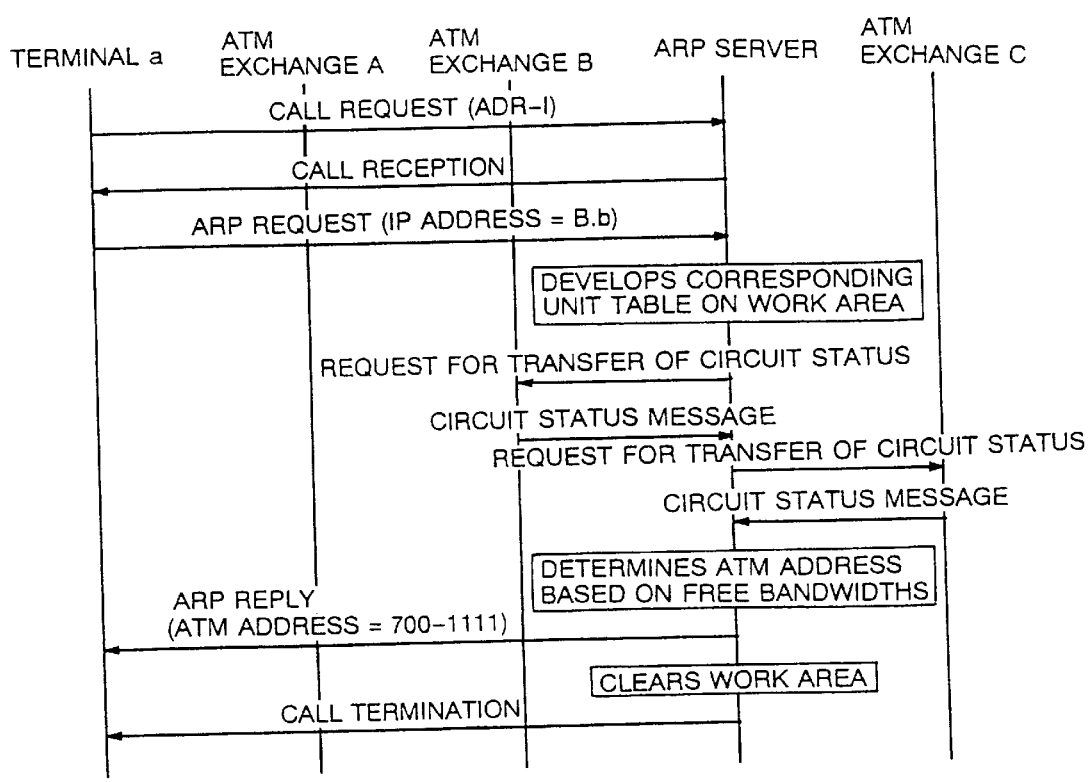
FIG. 8 is a signal sequence diagram of the first response process.

In this case, as shown in FIG. 8, first of all a call request message including ADR-I that is sent from the terminal 22a (terminal a in FIG. 8) reaches the ARP server 10 via the ATM exchange 20A and 20C (ATM exchanges A and C). Upon reception of this message, the ARP server 10 (control section 11) recognizes that it should execute the first response process, and transmits a call reception message to terminal a.

Upon reception of the call reception message, terminal a sends an ARP request packet including the IP address "B.b" of terminal b for which an ATM address is needed. In the ARP terminal 10 that has received the ARP request packet, the control section 11 searches the ATMARP table 12 for a unit table including the IP address "B.b" and develops the contents of a found unit table on the work area 15.

At this time, as schematically shown in FIG. 9A, the control section 11 develops the contents of the unit table on the work area 15 such that a maximum usable bandwidth (maximum use bandwidth in FIG. 9A), a bandwidth in use, and a free bandwidth can additionally be stored so as to be correlated with each ATM address included in the unit table.

Then, the control section 11 determines, based on the information stored in the work area 15, a node to which a request for transfer of information of a bandwidth in use etc. is to be sent, and sends a request for transfer of a use status to that node. In this case, the control section 11 determines a node by using the ATM address "700–1111" that is stored at the head of the work area 15. Thus, the control section 11 recognizes that the node that accommodates the circuit concerned is the ATM exchange 20B (station No.: 700), and sends a request for transfer of a circuit status to the ATM exchange as shown in FIG. 8. Upon reception of the request for transfer, ATM exchange B informs the ARP server 10 of a maximum usable bandwidth and a bandwidth in use of the circuit of inquiry.

For example, when informed by ATM exchange B that the maximum usable bandwidth and the bandwidth in use are 150 Mbps and 10 Mbps, respectively, the control section 11 writes these values in memory areas of the work area 15 corresponding to the ATM address "700–1111" as shown in FIG. 9B. Further, the control section 11 calculates a difference between those bandwidths (150 Mbps–10 Mbps), and stores the calculated bandwidth (140 Mbps) in a free bandwidth memory area of the work area 15 corresponding to the ATM address "700–1111."

Then, the control section 11 judges whether the processes for all the ATM addresses on the work area 15 have been completed. At this time point, a process for the ATM address "800–1112" has not been completed. Therefore, to acquire a maximum usable bandwidth and a bandwidth in use of a circuit relating to this ATM address, the control section 11 sends a request for transfer of a circuit status to ATM exchange C (station No. 800) as shown in FIG. 8. For example, when informed by ATM exchange C that the maximum usable bandwidth and the bandwidth in use are 150 Mbps and 150 Mbps, respectively, the control section 11 stores these values and a calculated free bandwidth "0" in areas of the work area 15 corresponding to the ATM address "800–1112."

At this stage, there remains no unprocessed ATM address. Therefore, as shown in FIG. 8, the control section 11 determines an ATM address with the largest free bandwidth among the ATM addresses stored in the work area 15, and sends, to terminal a, an ARP reply packet in which the determined ATM address ("700–1111" in this case) is set. Then, the control section 11 clears the work area 15 and completes the process that started with the reception of the call request message by sending a call termination message.

As described above, when accessed by using ADR-I, the ARP server 10 informs the calling terminal of an ATM address corresponding to a circuit with the largest free bandwidth among ATM addresses that can be used to communicate with the terminal corresponding to an IP address set in an ARP request packet. That is, each terminal in the communication network concerned can acquire an ATM address with which a call will be established at a highest probability by issuing an address inquiry to ADR-I.

Next, the operation of the ARP server 10 in executing the second response process will be described with reference to FIG. 10. To cause the ARP server 10 to execute the second response process, a calling terminal executes a process that is the same as the process described above in connection with FIG. 5 except an address to be included in a call request message.

Figure 10:
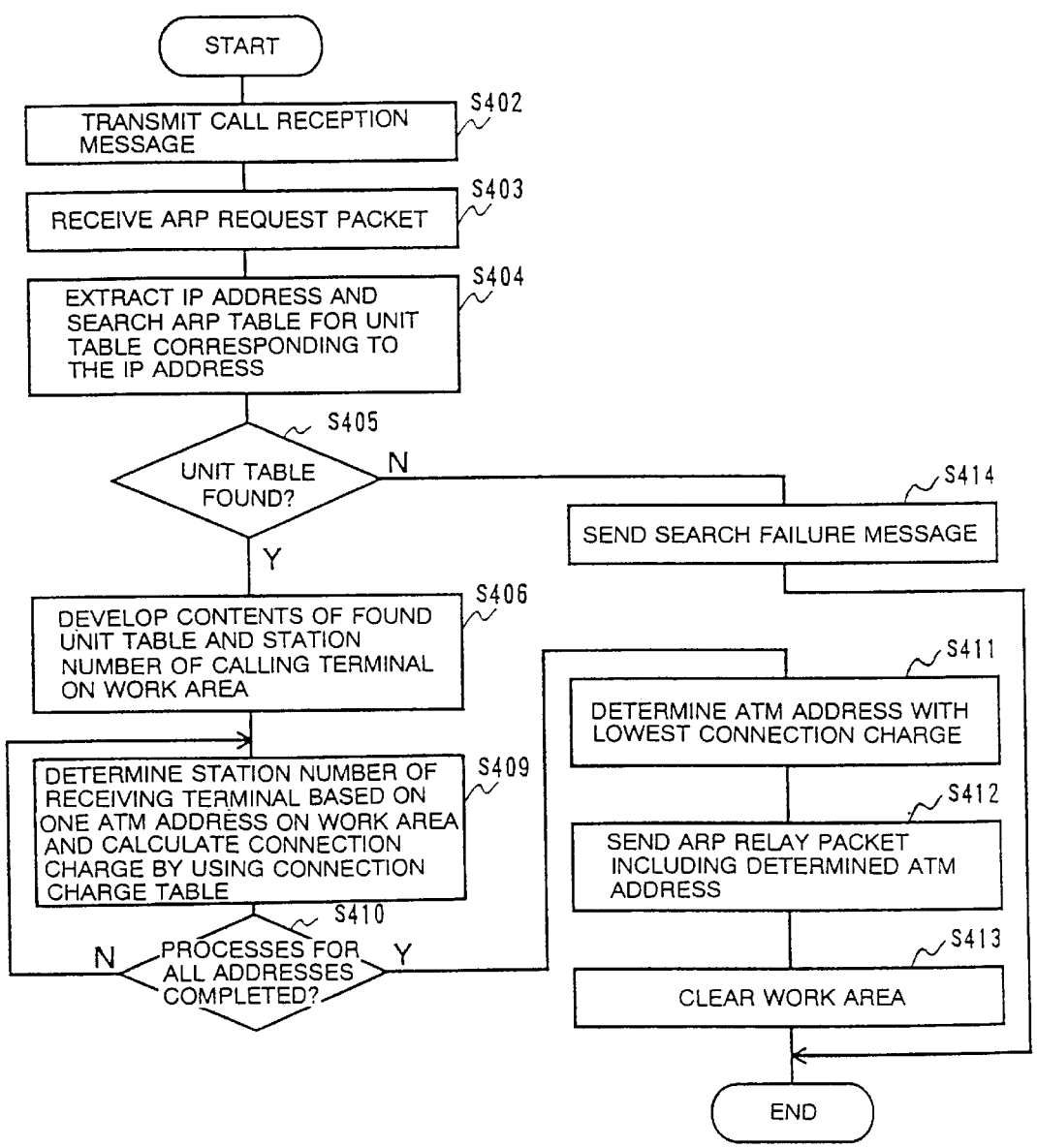
FIG. 10 is a flowchart showing an operation procedure of the ATMARP server of the embodiment in executing a second response process.

As seen from FIG. 10, the overall operation procedure of the control section 11 in executing the second response process is similar to steps S202–S214 (first response process) shown in FIG. 6. For example, steps S402–S405 and S412–S414 are entirely the same as steps S202–S205 and S212–S214, respectively.

Like steps S206–S211, the remaining steps S406 and S409–S411 are to determine one ATM address among ATM addresses of a unit table corresponding to an IP address that is sent from the calling terminal.

However, in steps S406 and S409–S411, one ATM address is determined according to a different criterion than in the first response process. A specific procedure is as follows. If a unit table corresponding to an IP address sent from the calling terminal exists in the ARP table 12 (step S405: Y), the control section 11 develops the content of the unit table and the station number of a node (ATM exchange) accommodating the calling terminal on the work area 15. At step S409, the control section 11 determines the station number of a node accommodating a receiving terminal based on an ATM address on the work area 15, and calculates connection charges of a circuit between the station numbers of the respective nodes accommodating the calling terminal and the receiving terminal by using the above station numbers and the connection charge table 13 (see FIG. 4). If there remains an unprocessed ATM address (step S410: N), the control section 11 returns to step S409, where it calculates a connection charge for that ATM address.

When the processes for all the ATM addresses have been completed (step S410: Y), at step S411 the control section 11 determines an ATM address with the lowest connection charge as an ATM address to be set in an ARP reply packet. At step S412, the control section 11 informs the calling terminal of the ATM address thus determined.

The operations of the calling terminal and the ARP server 10 will be described below in more detail with reference to FIGS. 11 and 12A–12C by using an example in which the terminal 22a (see FIG. 2) causes the second response process to be executed to acquire an ATM address of the terminal 22b.

Figure 11:
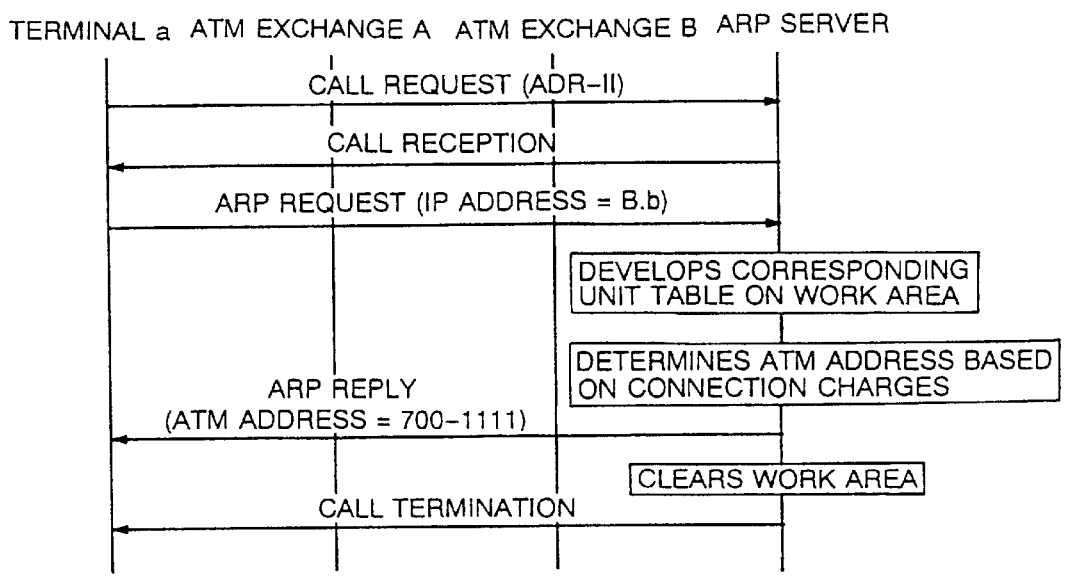
FIG. 11 is a signal sequence diagram of the second response process.

In this case, as shown in FIG. 11, first of all a call request message including ADR-II that is sent from the terminal 22a (terminal a in FIG. 11) reaches the ARP server 10 via the ATM exchange 20A and 20C (ATM exchanges A and C). Upon reception of this message, the ARP server 10 (control section 11) recognizes that it should execute the second response process, and transmits a call reception message to terminal a.

Upon reception of the call reception message, terminal a sends an ARP request packet including the IP address "B.b" of terminal b for which an ATM address is needed. In the ARP terminal 10 that has received the ARP request packet, the control section 11 searches the ATMARP table 12 for a unit table including the IP address "B.b." As shown in FIG. 12A, the contents of a found unit table are developed on the work area 15 together with the station number of a node accommodating the calling terminal (i.e., the calling station number).

Then, the control section 11 determines the station number (receiving station number) of a node corresponding to the first ATM address "700–1111" on the work area 15, and reads out a connection charge corresponding to the combination of the receiving station number and the calling station number from the connection charge table 13. The control section 11 stores the above data in the work area 15, as a result of which the work area 15 stores information shown in FIG. 12B. Then, the control section 11 executes a similar process for the ATM address "800–1112," to determine a connection charge that will be needed when this ATM address is used and to change the state of the work area 15 to one shown in FIG. 12C.

At this stage, there remains no unprocessed ATM address. Therefore, the control section 11 determines an ATM address with the lowest connection charge among the ATM addresses stored in the work area 15, and sends, to terminal a, an ARP reply packet in which the determined ATM address ("700–1111" in this case) is set as shown in FIG. 11. Then, the control section 11 clears the work area 15 and completes the process that started with the reception of the call request message by sending a call termination message.

As described above, when accessed by using ADR-II, the ARP server 10 informs the calling terminal of an ATM address with the lowest connection charge among ATM addresses that can be used to communicate with the terminal corresponding to an IP address set in an ARP request packet. Thus, the communication network concerned enables economical communications.

Next, the operation of the ARP server 10 in executing the second response process and a corresponding operation of a calling terminal will be described. First, with reference to FIG. 13, a description will be made of an operation procedure of a calling terminal in causing the ARP server 10 to execute the third response process.

Figure 13:
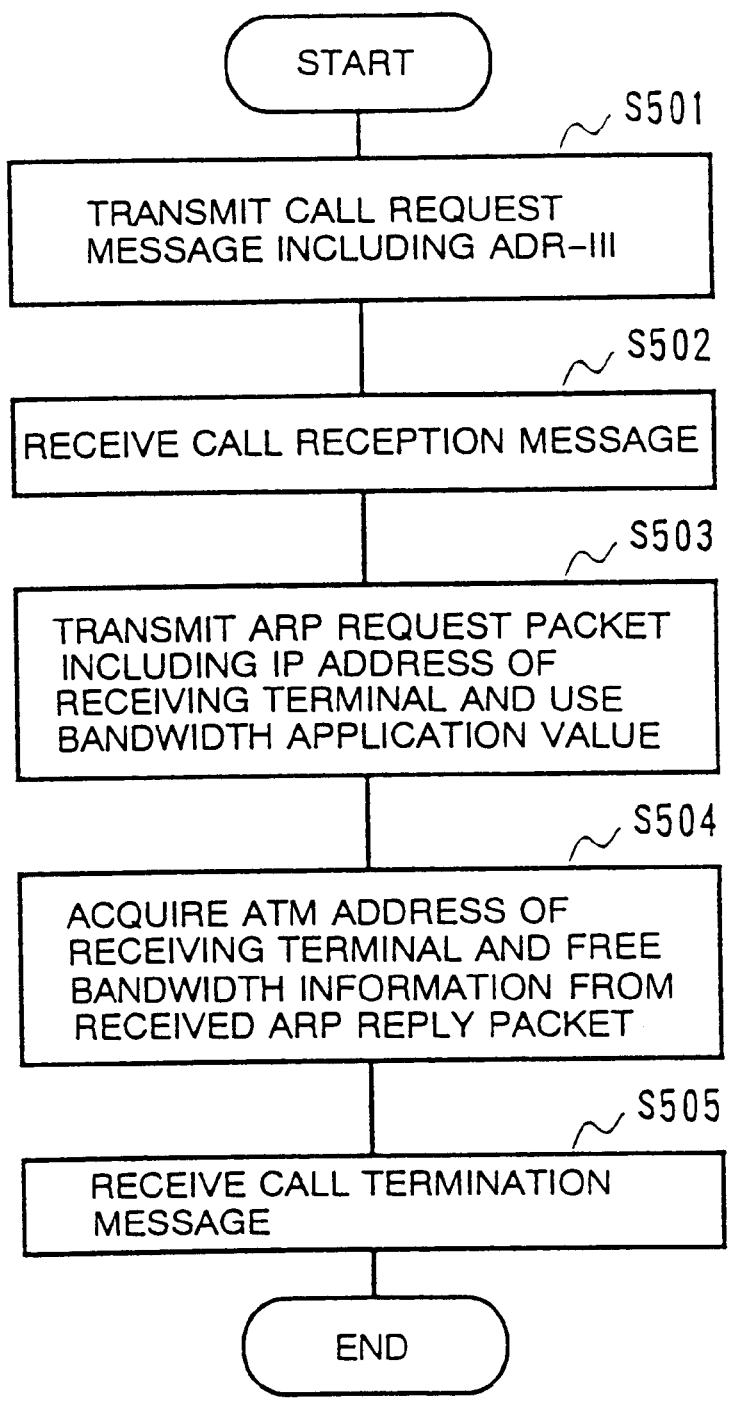
FIG. 13 is a flowchart showing an operation procedure of a calling terminal until it acquires an ATM address by using a third response process.

As shown in FIG. 13, to start the third response procedure, a calling terminal transmits a call request message including ADR-III at step S501. After receiving a call reception message at step S502, the calling terminal sends an ARP request packet including the IP address of a receiving terminal and a use bandwidth application value at step S503. Then, at step S504, the calling terminal receives an ARP reply packet and acquires an ATM address of the receiving terminal and free bandwidth information. When receiving a call termination request from the ARP server 10, the calling terminal finishes the series of processes.

As described above, in using the third response process, the calling terminal operates according to a different procedure than in using the first or second response process.

Figure 14:
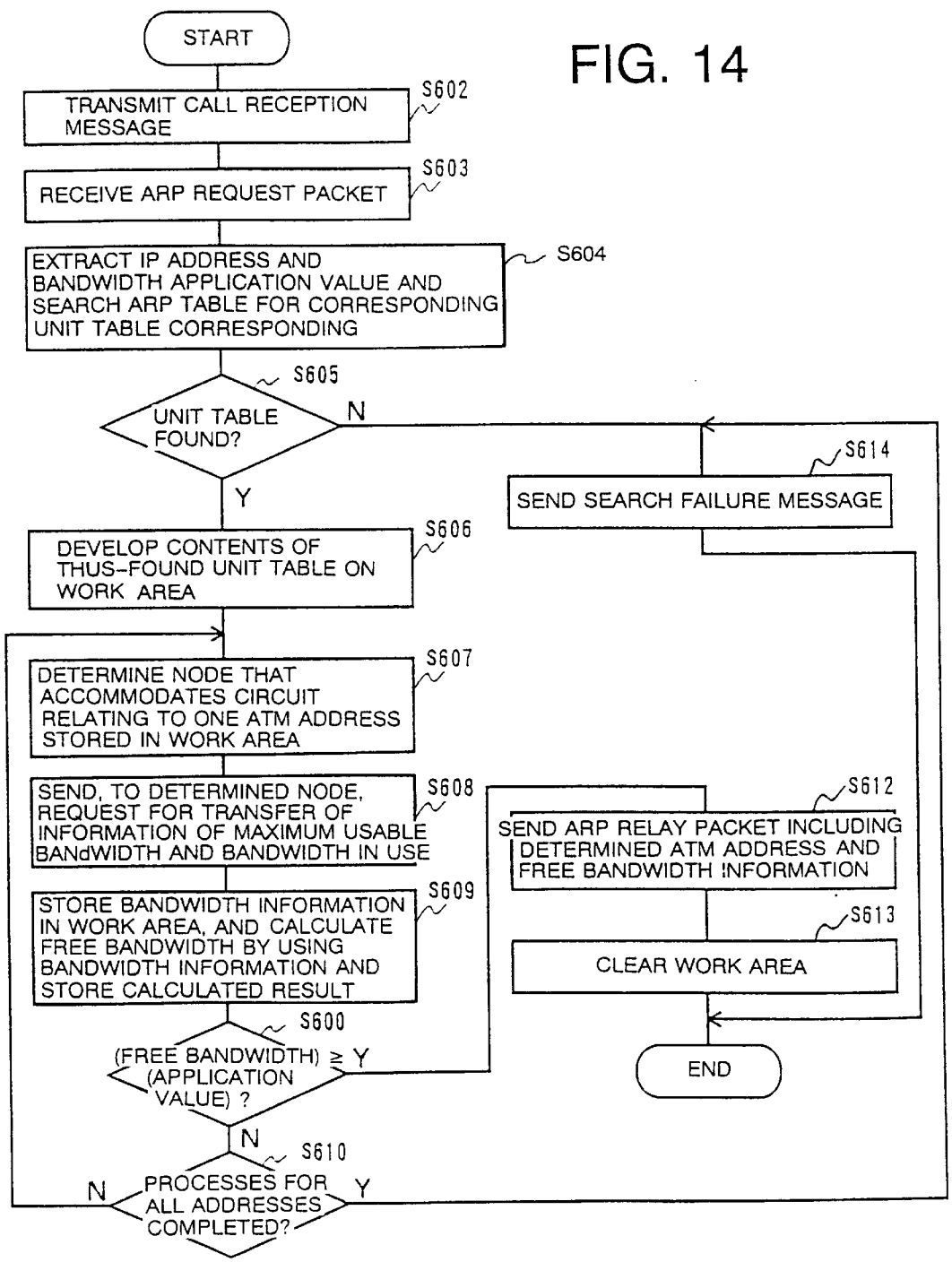
FIG. 14 is a flowchart showing an operation procedure of the ATMARP server of the embodiment in executing the third response process.

On the other hand, when receiving a call request message including ADR-III, the ARP server 10 (control section 11) operates according to a procedure shown in FIG. 14. To facilitate a comparison with the operation procedure in executing the first response process, the last two figures of the symbol of each step in FIG. 14 are made the same number as that of the corresponding step in FIG. 6.

First, at step S602, the control section 11 transmits a call reception message to a calling terminal. At step S603, the control section 11 receives an ARP request packet including an IP address and a bandwidth application value from the calling terminal that received the call reception message. When receiving such an ARP request packet, at step S604 the control section 11 extracts the IP address from the packet and the bandwidth application value and searches the ARP table 12 for a unit table relating to that IP address.

If a unit table relating to the extracted IP address was found (step S605: Y), at step S606 the control section 11 develops the contents of the unit table on the work area 15 together with the bandwidth application value that was extracted at step S604. In this case, as in the case of the first response process, the control section 11 develops the contents of the unit table such that various kinds of information (maximum usable bandwidth, bandwidth in use, etc.) that will be acquired or calculated later can be stored so as to be correlated with each ATM address included in the unit table.

At step S607, the control section 11 determines a node (ATM exchange) that accommodates a terminal that is identified by one ATM address stored in the work area 15. After the node determination, at step S608, the control section 11 sends, to the node, a request for transfer of a circuit status (maximum usable bandwidth and bandwidth in use) of the terminal concerned.

At step S609, the control section 11 stores information of a maximum usable bandwidth and a bandwidth in use that is received from the node to which the transfer request was sent in the work area 15 such that they are correlated with the ATM address that was determined at step S607. Further, the control section 11 calculates a free bandwidth (=(maximum usable bandwidth)−(bandwidth in use)) by using the above bandwidth information and stores the information of the calculated free bandwidth in the work area 15.

At step S600, the control section 11 judges whether the calculated free bandwidth is greater than or equal to the bandwidth application value. If the free bandwidth is smaller than the bandwidth application value (step S600: N), at step S610 the control section 11 judges whether the processes for all the ATM addresses stored in the work area 15 have been completed. If they have not been completed yet (step S610: N), the control section 11 again executes steps S607–S609 and S600 to acquire a free bandwidth of a circuit for the next ATM address.

The control section 11 repeats the above process until a calculated free bandwidth greater than or equal to the bandwidth application value is obtained or the processes for all the ATM addresses are completed. When a calculated free bandwidth greater than or equal to the bandwidth application value is obtained (step S600: Y), at step S612 the control section 11 transmits an ARP reply packet including the free bandwidth information and the ATM address to the calling terminal. Then, the control section clears the work area 15 at step S613 and finishes the process shown in FIG. 14.

On the other hand, if the processes for all the ATM addresses are completed without finding any free bandwidth greater than or equal to the bandwidth application value (step S510: Y), the control section 11 clears the work area 15 (this step is not shown in FIG. 14), then sends a message to the effect that an ATM address that satisfies the condition has not been found (step S614), and finishes the process.

The operations of the calling terminal and the ARP server 10 will be described below in more detail with reference to FIGS. 15 and 16A–16C by using an example in which the calling terminal is the terminal 22a and the calling terminal needs an ATM address of the terminal 22b that is set in the unit table shown in FIG. 3.

Figure 15:
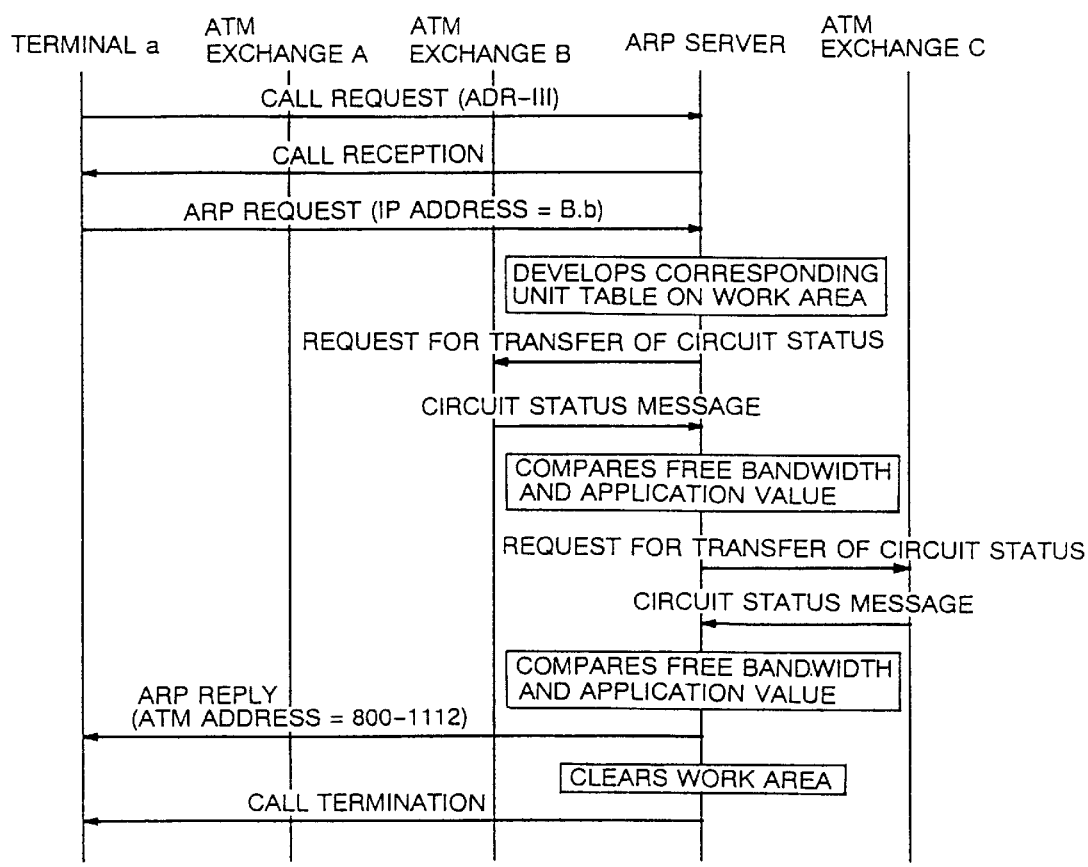
FIG. 15 is a signal sequence diagram of the third response process.

In this case, as shown in FIG. 15, first of all a call request message including ADR-III that is sent from the terminal 22a (terminal a in FIG. 15) reaches the ARP server 10 via the ATM exchange 20A and 20C (ATM exchanges A and C). Upon reception of this message, the ARP server 10 (control section 11) recognizes that it should execute the third response process, and transmits a call reception message to terminal a.

Upon reception of the call reception message, terminal a sends an ARP request packet including the IP address "B.b" of terminal b for which an ATM address is needed and a bandwidth application value "100 Mbps." In the ARP terminal 10 that has received the ARP request packet including such information, the control section 11 searches the ATMARP table 12 for a unit table including the IP address "B.b" and develops the contents of a found unit table on the work area 15 together with the bandwidth application value "100 Mbps" as shown in FIG. 16A.

Then, the control section 11 determines, based on the information stored in the work area 15, a node to which a request for transfer of information of a bandwidth in use etc. is to be sent, and sends a request for transfer of a use status to that node. That is, the control section 11 selects ATM exchange B (station No.: 700) as a node to which a request for transfer of a circuit status is to be sent by using the ATM address "700–1111" that is stored at the head of the work area 15. Then, the control section 11 is informed by ATM exchange B of a maximum usable bandwidth and a bandwidth in use by sending a request for transfer of a circuit status to ATM exchange B as shown in FIG. 15.

For example, when informed by ATM exchange B that the maximum usable bandwidth and the bandwidth in use are 150 Mbps and 100 Mbps, respectively, the control section 11 writes these values in memory areas of the work area 15 corresponding to the ATM address "700–1111" as shown in FIG. 16B. Further, the control section 11 calculates a difference between those bandwidths (150 Mbps–100 Mbps), and stores the calculated bandwidth (50 Mbps) in a free bandwidth memory area of the work area 15 corresponding to the ATM address "700–1111."

Then, the control section 11 judges a magnitude relationship between the calculated free bandwidth and the bandwidth application value. In this case, since the free bandwidth is smaller than the bandwidth application value, the control section 11 extracts an unprocessed ATM address from the work area 15. The control section 11 recognizes based on the extracted ATM address "800–1112" that a node to which a request for transfer of a circuit status is ATM exchange C, and receives a circuit status message from ATM exchange C as shown in FIG. 15.

For example, when informed through a circuit status message that the maximum usable bandwidth and the bandwidth in use are 150 Mbps and 10 Mbps, respectively, the control section 11 writes these values and a calculated free bandwidth (140 Mbps) in the work area 15 such that they are correlated with the ATM address "800–1112" as shown in FIG. 16C. Then, the control section 11 judges a magnitude relationship between the calculated free bandwidth and the bandwidth application value. In this case, since the free bandwidth is larger than the bandwidth application value, the control section 11 determines the ATM address concerned as an address of which to inform the calling terminal. Thus, the control section 11 transmits an ARP reply packet in which the ATM address "800–1112" and the free bandwidth "100" are set, as shown in FIG. 15.

As described above, when accessed by using ADR-III, the ARP server 10 informs the calling terminal of a current free bandwidth and an ATM address that can secure a bandwidth necessary for the intended communication among ATM addresses that can be used to communicate with the terminal corresponding to an IP address set in an ARP request packet sent from the calling terminal. If the bandwidth necessary for the intended communication, the control section 11 informs the calling terminal of that fact. Thus, by using the above process, each terminal in the communication network concerned can acquire, if any, an ATM address with a free bandwidth larger than the necessary value.

Figure 17:
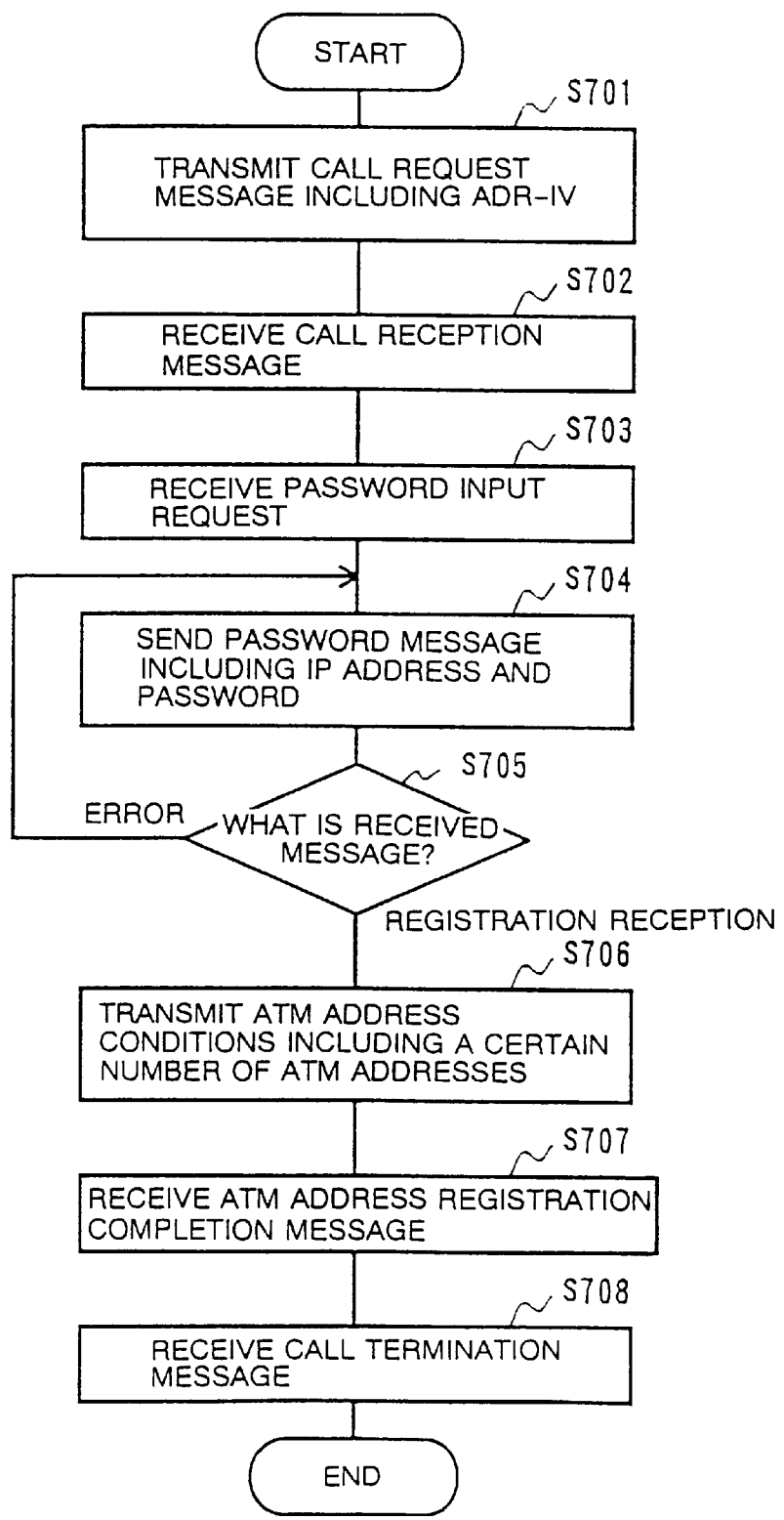
FIG. 17 is a flowchart showing an operation procedure of a calling terminal in using an address registration process.
Figure 18:
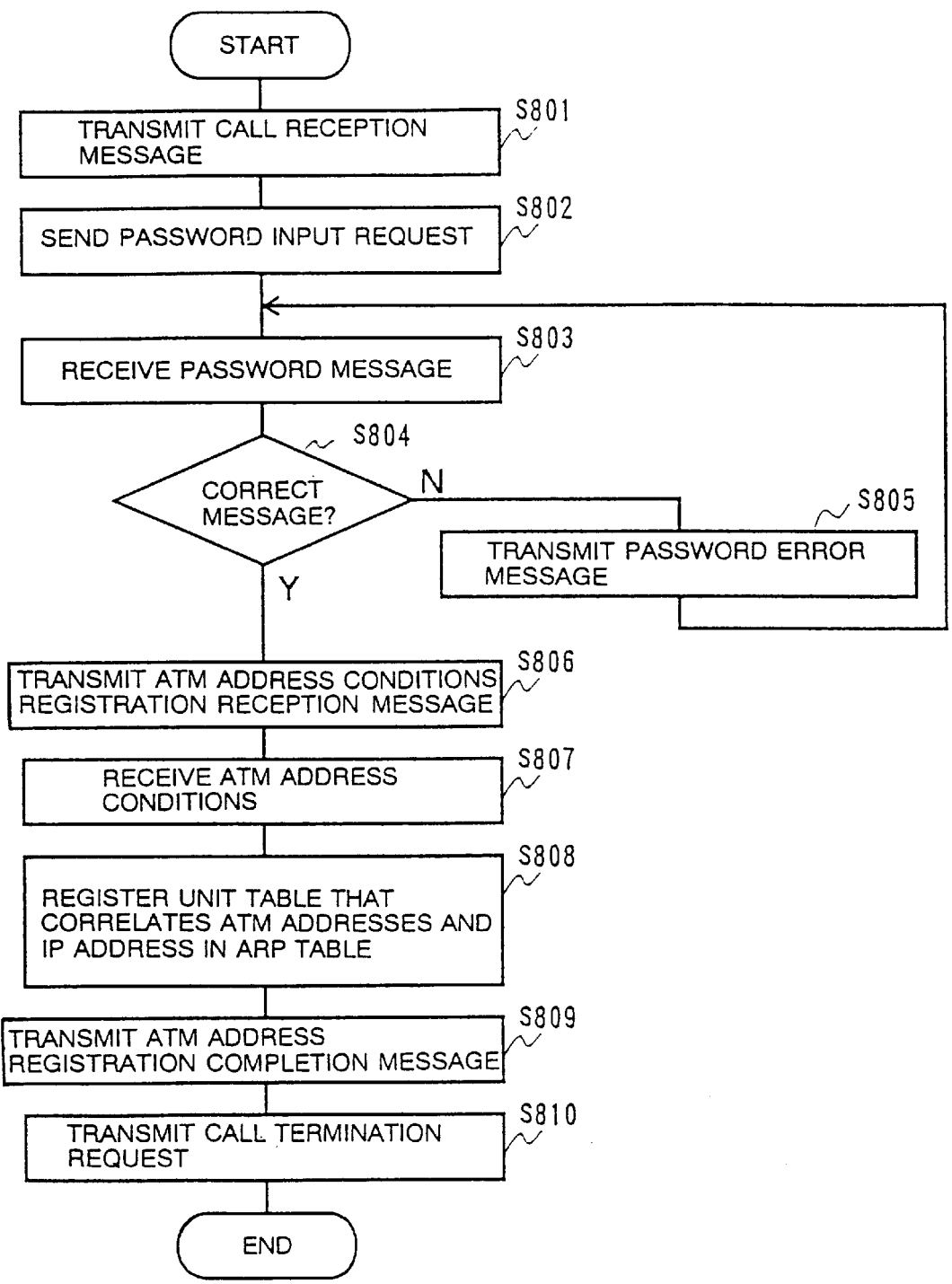
FIG. 18 is a flowchart showing an operation procedure of the ATMARP server of the embodiment in executing the address registration process.
Figure 19:
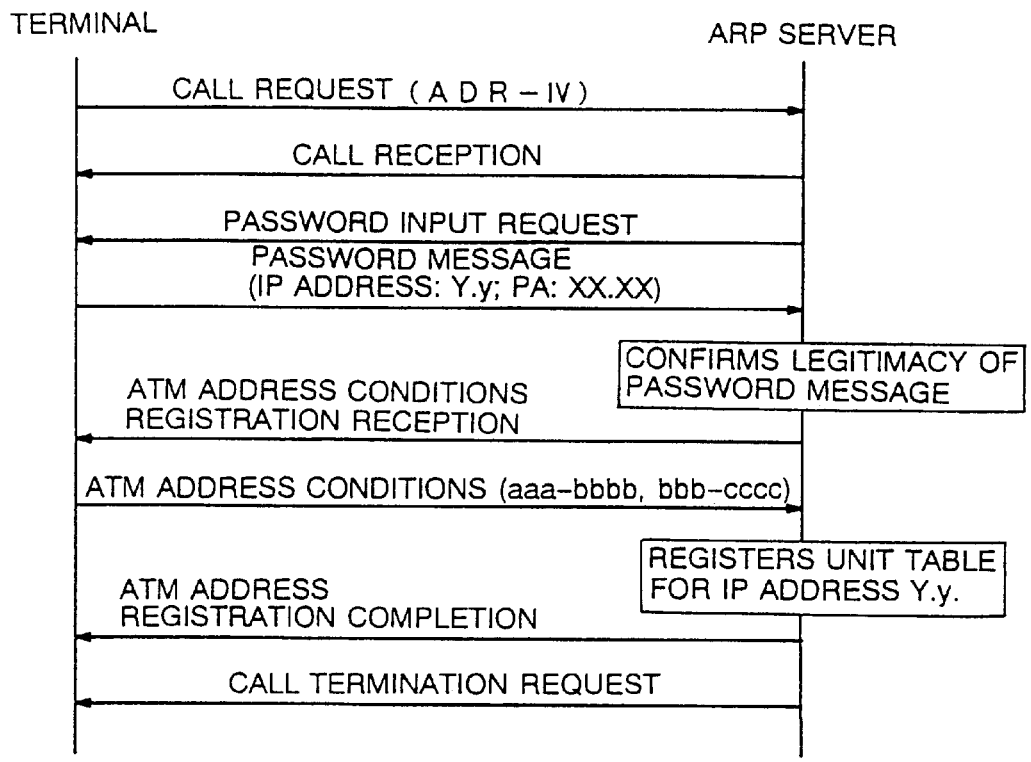
FIG. 19 is a signal sequence diagram of the address registration process.

Next, the operations of a terminal and the ARP server 10 in registering a unit table in the ATMARP table 12 from the terminal will be described with reference to FIGS. 17 to 19. FIG. 17 is a flowchart showing an operation procedure of a terminal that requests execution of the address registration process. FIG. 18 is a flowchart of the address registration process that is executed by the control section 11 of the ARP server 10 when a request for address registration is made. FIG. 19 is a sequence diagram showing an example of signals that are exchanged between the ARP server 10 and a terminal in using the address registration process.

To register, in the ATMARP table 12, a unit table relating to a terminal that has a certain IP address or updating the contents of an already registered unit table, at step S701 (see FIG. 17) a person who intends registration sends a call request message including ADR-IV to the ARP server 10 by using a terminal in the communication network concerned (usually, a terminal to which the IP address of interest is allocated).

The ARP server 10 (control section 11) that has received the call request message recognizes that a request for execution of the address registration process is made because the address ADR-IV is included in the message. Thus, the control section 11 initiates the address registration process and sends a call reception message and a password input request message (steps S801 and S802; see FIG. 18).

When receiving the call reception message and the password input request message at steps S702 and S703 (see FIG. 17), the calling terminal transmits a password message including a password that is input by a user and a password corresponding to the IP address at step S704 and waits for transmission of a message from the ARP server 10 at step S705.

When receiving the password message at step S803 (see FIG. 18), at step S804 the control section 11 of the ARP server 10 judges legitimacy of the password message based on the correlation between IP addresses and passwords stored in the password table 14. If the message is not legitimate (step S804: N), the control section 11 transmits a password error message at step S805 and returns to step S803 to wait for reception of another password. On the other hand, if the password message is legitimate (step S804: Y), the control section 11 transmits an ATM address conditions registration message at step S806.

When receiving the ATM address conditions registration message (step S705: registration reception; see FIG. 17), at step S706 the calling terminal transmits, to the ARP server 10, ATM address conditions including a certain number of ATM addresses that are input by the user. On the other hand, when receiving the password error message (step S705: error), the calling terminal again executes steps S704–S705.

If the control section 11 of the ARP server 10 previously sent the ATM address conditions registration reception message, it now receives the ATM address conditions at step S807 (see FIG. 18). At step S808, the control section 11 registers, in the ATMARP table 12, the information (unit table) as a combination of the ATM addresses included in the ATM address conditions and the IP address that was sent through the password message. Then, the control section 11 sends an ATM address registration completion message and a call termination request at steps S809 and S810, and finishes the address registration process.

The calling terminal finishes the process of FIG. 17 when receiving the ATM address registration completion message and the call termination request at steps S707 and S708.

That is, when an erroneous password input is not made, a call request message, a call reception message/password input request message, a password message, an ATM address conditions registration message, and ATM address conditions are exchanges in this order between the call terminal and the ARP server 10 as shown in FIG. 19. As shown in FIG. 19, if an IP address "Y.y" is included in the password message and two ATM addresses "aaa-bbbb" and "bbb-cccc" are included in the ATM address conditions, a unit table containing "aaa-bbbb" and "bbb-cccc" for the IP address "Y.y" is registered in the ATMARP table 12.

As described above, in the communication network concerned, the contents of the ATMARP table 12 can be updated from a terminal.

Modifications

In the above embodiment, when the ARP server 10 cannot find a free bandwidth greater than or equal to the bandwidth application value in executing the third response process, it informs a calling terminal that a circuit satisfying a requested condition has not been found, without informing the calling terminal if an ATM address. It goes without saying that the ARP server 10 may be adapted to inform the calling terminal of an ATM address with a largest free bandwidth or an ATM address stored at the head of the unit table, even if such a circuit cannot be found.

While in the above embodiment the ARP server 10 can execute the three response processes, it may be adapted to execute only one of those processes. For example, the ARP server 10 may be constructed so as to execute a response process that selects one ATM address in accordance with the time (and the date) when a call request is received.

While in the above embodiment the ARP server 10 is given a plurality of addresses so as to allow a calling terminal to select a response process, information for selecting a response process may be included in an ARP request or the like.

Figure 20:
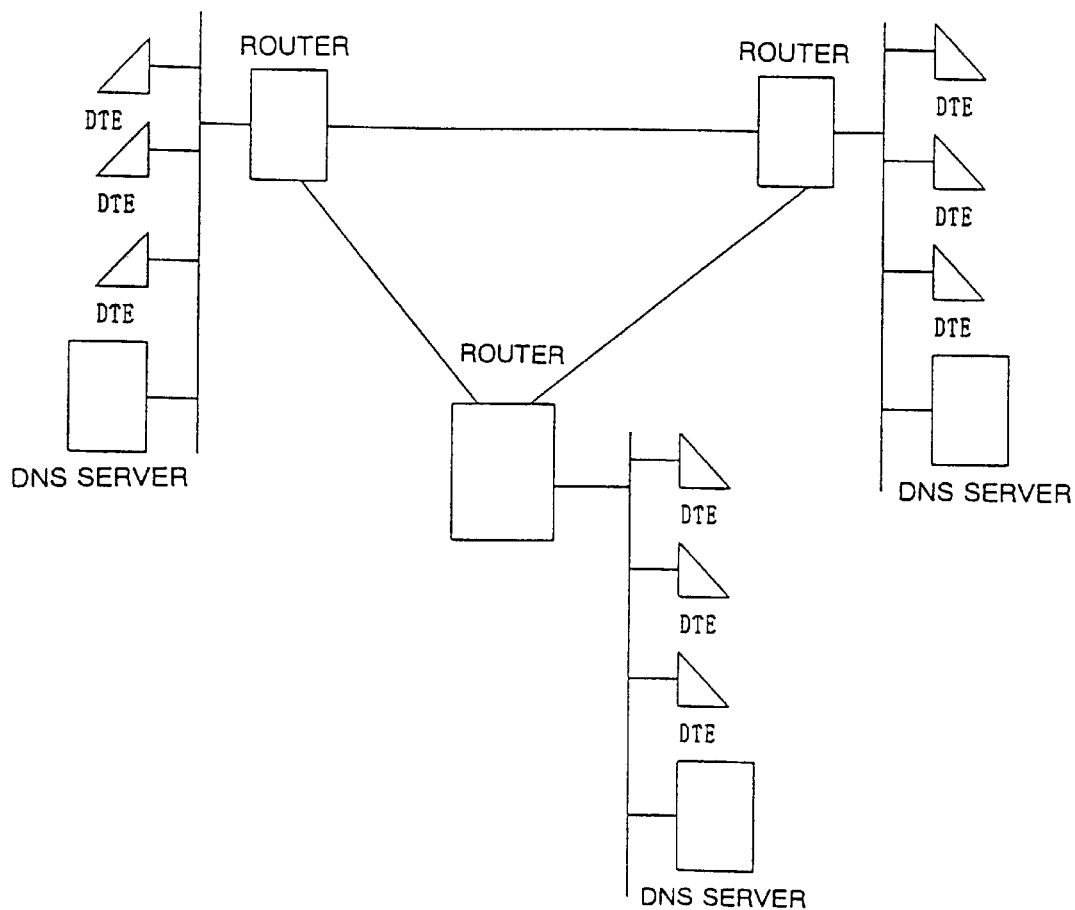
FIG. 20 shows a general configuration of a TCP/IP network to which the invention can be applied.

Further, although the communication network of the embodiment is one according to IP over ATM, the technique disclosed in the embodiment can also be applied to LE ARP, DNS, etc. In the case of LE ARP, the respective sections and apparatuses may be constructed so as to use a MAC address instead of an IP address. In the case of DNS, in which in general a TCP/IP network as shown in FIG. 20 is used, an apparatus may be employed as each DNS server shown in FIG. 20 which is obtained by modifing the ARP server 10 so that a domain name and an IP address are used instead of an IP address and an ATM address, respectively. In this case, as in the case of the embodiment, a network can be constructed which can provide a calling terminal that outputs a domain name of a receiving terminal with an IP address suitable for an intended communication with the receiving terminal among a plurality of IP addresses usable for that purpose according to a certain criterion. However, since a TCP/IP network has no method for knowing a free bandwidth, it is impossible to cause a DNS server to execute such processes as the first and third response processes.

What is claimed is:

1. An ARP server to be used in a network in which a communication is performed according to a first protocol, comprising:

storing means for storing, for each of a plurality of terminals that perform a communication by using the network, a second address that is used in performing a communication according to a second protocol and at least one first address that can be used in performing a communication according to the first protocol;

recognizing means for recognizing, based on received information, a second address for which a first address is to be selected and a terminal to be informed of the selected first address;

readout means for reading out all of first addresses corresponding to the recognized second address from the storing means;

selecting means for selecting one first address from among the read-out first addresses according to a predetermined condition; and transmitting means for transmitting the selected first address to the terminal recognized by the recognizing means.

2. The ARP server according to claim 1, wherein the selecting means selects one first address by using a condition that relates to a date and time.

3. The ARP server according to claim 1, further comprising condition changing means for changing the condition used in the selecting means based on received information.

4. The ARP server according to claim 3, wherein the condition changing means changes the condition used in the selecting means based on a first address included in information that is first received by the recognizing means.

5. The ARP server according to claim 1, further comprising acquiring means for acquiring a free bandwidth of a circuit relating to each of the read-out first addresses, wherein the selecting means selects a first address with a largest free bandwidth from among the read-out first addresses.

6. The ARP server according to claim 1, further comprising:

charge information storing means for storing charge information to be used for calculation of a charge of a communication that uses a first address; and charge calculating means for calculating a charge of a communication between the recognized terminal and each of the read-out first addresses, wherein the selecting means selects a first address with a lowest charge from among the read-out first addresses.

7. The ARP server according to claim 1, further comprising:

bandwidth application value recognizing means for recognizing a bandwidth application value based on received information; and acquiring means for sequentially acquiring free bandwidths of circuits relating to the respective read-out first addresses, wherein the selecting means selects, if the acquiring means has acquired a free bandwidth greater than or equal to the recognized bandwidth application value, a first address that was used in acquiring it.

8. The ARP server according to claim 7, wherein the selecting means selects a first address with a largest free bandwidth if the bandwidth application value recognizing means has not recognized any bandwidth application value.

9. The ARP server according to claim 7, wherein the selecting means selects a first address that was first read out by the readout means if the bandwidth application value recognizing means has not recognized any bandwidth application value.

10. The ARP server according to claim 7, further comprising a second transmitting means for transmitting, if an operation of the acquiring means has completed without acquiring a free bandwidth greater than or equal to the recognized bandwidth application value, information to that effect to the recognized terminal.

11. The ARP server according to claim 7, wherein the selecting means selects a first address with a largest free bandwidth if an operation of the acquiring means has completed without acquiring a free bandwidth greater than or equal to the recognized bandwidth application value.

12. The ARP server according to claim 7, wherein the selecting means selects a first address that was first read out by the readout means if an operation of the acquiring means has completed without acquiring a free bandwidth greater than or equal to the recognized bandwidth application value.

13. The ARP server according to claim 7, wherein the transmitting means for transmitting, to the recognized terminal, the selected first address and a free bandwidth acquired by the acquiring means for the selected first address.

14. The ARP server according to claim 1, further comprising updating means for updating contents of the storing means based on received information.

15. The ARP server according to claim 1, wherein the first protocol is an ATM protocol.

16. The ARP server according to claim 1, wherein the first protocol is an IP protocol and the second address is a domain name.

17. An ARP server to be used in a network in which a communication is performed according to a first protocol, comprising:

storing means for storing, for each of a plurality of terminals that perform a communication by using the network, sets of a second address that is used in performing a communication according to a second protocol, at least one first address that can be used in performing a communication according to the first protocol and information used as selection condition of the first address;

recognizing means for recognizing, based on received information, a second address for which a first address is to be selected and a terminal to be informed of the selected first address;

readout means for reading out all of first addresses corresponding to the recognized second address from the storing means;

selecting means for selecting one first address from among the read-out first addresses according to a predetermined condition; and transmitting means for transmitting the selected first address to the terminal recognized by the recognizing means.

* * * * *